(12) United States Patent
Uematsu

(10) Patent No.: US 9,300,833 B2
(45) Date of Patent: Mar. 29, 2016

(54) IMAGE READING DEVICE AND IMAGE FORMING APPARATUS

(71) Applicant: FUJI XEROX CO., LTD., Tokyo (JP)

(72) Inventor: Mari Uematsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/618,117

(22) Filed: Feb. 10, 2015

(65) Prior Publication Data

US 2015/0264216 A1 Sep. 17, 2015

(30) Foreign Application Priority Data

Mar. 11, 2014 (JP) ................................ 2014-048067

(51) Int. Cl.
*H04N 1/04* (2006.01)
*H04N 1/10* (2006.01)
*H04N 1/00* (2006.01)

(52) U.S. Cl.
CPC ......... *H04N 1/1061* (2013.01); *H04N 1/00588* (2013.01); *H04N 2201/0081* (2013.01)

(58) Field of Classification Search
CPC .............. H04N 2201/0081; H04N 2201/0094; H04N 1/1013; H04N 1/1235; H04N 1/00013; H04N 1/00602; H04N 1/12; H04N 1/121; H04N 1/0066; H04N 1/1039; H04N 1/125; G03G 15/607; G03G 21/1619; G03G 2215/00
USPC ......... 358/498, 474, 497, 475, 449, 496, 538; 399/159, 321, 341, 391, 69, 92
See application file for complete search history.

(56) References Cited

U.S. PATENT DOCUMENTS

| | | | | |
|---|---|---|---|---|
| 5,206,689 | A * | 4/1993 | Kusuda | 399/14 |
| 5,323,212 | A * | 6/1994 | Fukui | 399/14 |
| 7,502,147 | B2 * | 3/2009 | Suzuki et al. | 358/504 |
| 7,813,010 | B2 * | 10/2010 | Michiie et al. | 358/474 |
| 7,909,442 | B2 * | 3/2011 | Samoto | B41J 2/17509 347/103 |
| 8,300,279 | B2 * | 10/2012 | Mukai | H04N 1/0083 174/350 |
| 8,444,135 | B2 * | 5/2013 | Morita et al. | 271/3.17 |
| 8,493,638 | B2 * | 7/2013 | Lee | 358/497 |
| 8,643,911 | B2 * | 2/2014 | Maeda | 358/474 |
| 8,699,093 | B2 * | 4/2014 | Takeuchi | H04N 1/0285 358/474 |

(Continued)

FOREIGN PATENT DOCUMENTS

| | | |
|---|---|---|
| JP | 6-037976 A | 2/1994 |
| JP | 3661789 B2 | 6/2005 |

(Continued)

*Primary Examiner* — Negussie Worku
(74) *Attorney, Agent, or Firm* — Sughrue Mion, PLLC

(57) ABSTRACT

An image reading device includes a first and second document tables, a document transport member, and a reading unit. The first document table supports a document sheet. The second document table adjacent to the first document table allows the document sheet to pass therethrough while the document sheet is kept separate from the second document table. The reading unit, which reads the document sheet, includes a movement unit movable relative to the first and second document tables. At least one of positions of the first document table, the second document table, and a position where the document sheet is transported is set so as to cause an optical path length between the reading unit and the document sheet passing through the second document table to correspond to an optical path length between the reading unit and the document sheet supported by the first document table.

6 Claims, 6 Drawing Sheets

(56) References Cited

U.S. PATENT DOCUMENTS

| | | | |
|---|---|---|---|
| 8,736,926 B2* | 5/2014 | Suzuki et al. .................. | 358/498 |
| 2005/0195450 A1* | 9/2005 | Shoji .................. | H04N 1/00631 |
| | | | 358/497 |
| 2007/0216969 A1* | 9/2007 | Nishina ................ | H04N 1/0473 |
| | | | 358/509 |
| 2011/0242624 A1* | 10/2011 | Takeuchi ........... | H04N 1/00546 |
| | | | 358/498 |
| 2015/0156360 A1* | 6/2015 | Horiguchi .......... | H04N 1/00822 |
| | | | 358/498 |

FOREIGN PATENT DOCUMENTS

| | | |
|---|---|---|
| JP | 2007-013309 A | 1/2007 |
| JP | 2012-151568 A | 8/2012 |

* cited by examiner

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2014-048067 filed Mar. 11, 2014.

BACKGROUND

Technical Field

The present invention relates to an image reading device and an image forming apparatus.

SUMMARY

According to an aspect of the present invention, there is provided an image reading device including a first document table, a second document table, a document transport member, and a reading unit. The first document table is transparent and supports a document sheet on which an image is recorded. The second document table is transparent and disposed adjacent to the first document table. The second document table allows the document sheet being transported to pass therethrough while the document sheet is kept separate from the second document table. The document transport member transports the document sheet toward the second document table. The reading unit is supported on a side opposite to the document sheet with the first and second document tables interposed therebetween and reads the document sheet. The reading unit includes a movement unit movable in a preset first direction relative to the first and second document tables. The reading unit, when reading the document sheet on the first document table, reads the image on the document sheet while the movement unit is moving in the first direction, and when reading the document sheet on the second document table, reads the image on the document sheet transported by the document transport member while the movement unit is stopped at a position facing the second document table. In the image reading device, at least one of a position of the first document table, a position of the second document table, and a position where the document sheet is transported is set so as to cause an optical path length between the reading unit and the document sheet passing through the second document table in accordance with a distance between the document sheet transported by the document transport member and the second document table and a thickness of the second document table to correspond to an optical path length between the reading unit and the document sheet supported by the first document table in accordance with a thickness of the first document table.

BRIEF DESCRIPTION OF THE DRAWINGS

Exemplary embodiments of the present invention will be described in detail based on the following figures, wherein.

DETAILED DESCRIPTION

Figure 1:
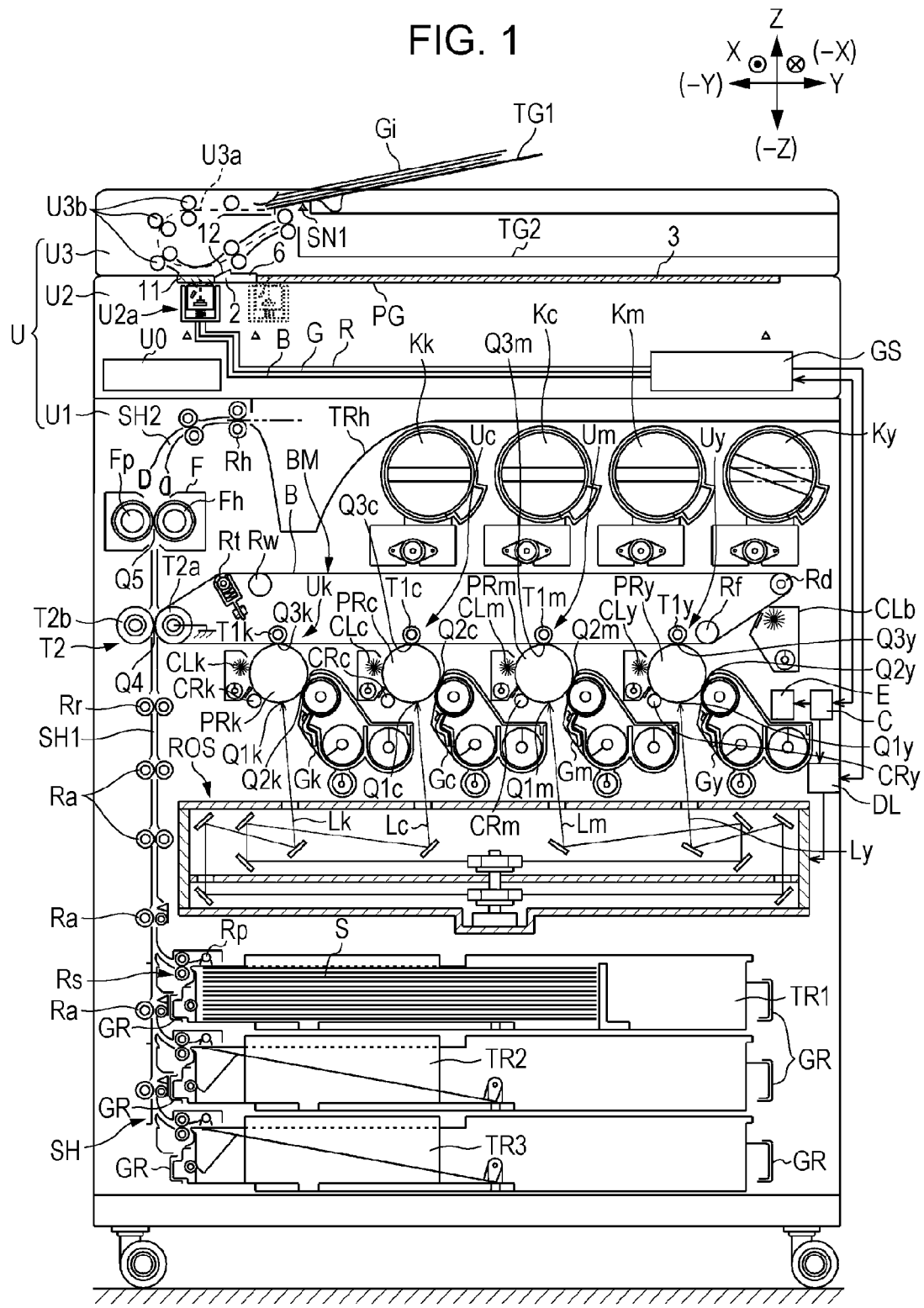
FIG. 1 is an overall explanatory view of an image forming apparatus according to a first exemplary embodiment.

Next, specific examples of exemplary embodiments of the present invention (referred to as exemplary embodiments hereafter) will be described with reference to the drawings. It is to be understood that the present invention is not limited to the following exemplary embodiments.

For ease of understanding of the description hereafter, the front-rear direction, the left-right direction, and the vertical direction in the drawings are respectively defined as the X direction, the Y direction, and the Z direction. Directions or sides indicated by arrows X, –X, Y, –Y, Z, and –Z are respectively indicate the front, rear, right, left, upper, and lower directions or sides.

Also, circles marked with dots therein and circles marked with "x"s therein illustrated in the pages of the drawings respectively indicate arrows extending from the back side to the front side of the pages and arrows extending from the front side to the back side of the page.

It is noted that, in the following description with reference to the drawings, elements other than those required for the description may be omitted from the drawings as appropriate for ease of understanding.

First Exemplary Embodiment

FIG. 1 is an overall explanatory view of an image forming apparatus according to a first exemplary embodiment.

In FIG. 1, a copier U includes a printer unit U1. The copier U serves as an example of the image forming apparatus according to the first exemplary embodiment of the present invention. The printer unit U1 serves as an example of a recording unit and also serves as an image recording device. A scanner unit U2 is supported on the upper side of the printer unit U1. The scanner unit U2 serves as an example of an image reader and also serves as an example of an image reading device. An automatic feeder U3 is supported on the upper side of the scanner unit U2. The automatic feeder U3 serves as an example of a document transport device. The scanner unit U2 according to the first exemplary embodiment supports a user interface U0. The user interface U0 serves as an example of an input unit. The user interface U0 allows an operator to enter input so as to operate the copier U.

A document tray TG1 is disposed on the upper side of the automatic feeder U3. The document tray TG1 serves as an example of a medium container. The document tray TG1 is capable of containing plural document sheets Gi to be copied such that the plural document sheets Gi are stacked one on top of another. A document sheet ejection tray TG2 is formed on the lower side of the document tray TG1. The document sheet ejection tray TG2 serves as an example of a document ejection unit. Document transport rollers U3b are disposed between the document tray TG1 and the document sheet ejection tray TG2 along a document transport path U3a.

A platen glass PG is disposed on an upper surface of the scanner unit U2. The platen glass PG serves as an example of a transparent document table. A reading unit U2a is disposed on the lower side of the platen glass PG in the scanner unit U2 according to the first exemplary embodiment. The reading unit U2a according to the first exemplary embodiment is supported such that the reading unit U2a is movable in the left-right direction along a lower surface of the platen glass PG. The left-right direction serves as an example of a sub-scanning direction. The reading unit U2a is stopped at an initial position indicated by solid lines in FIG. 1 in an ordinary state. The reading unit U2a is electrically connected to an image processing unit GS.

Figure 2:
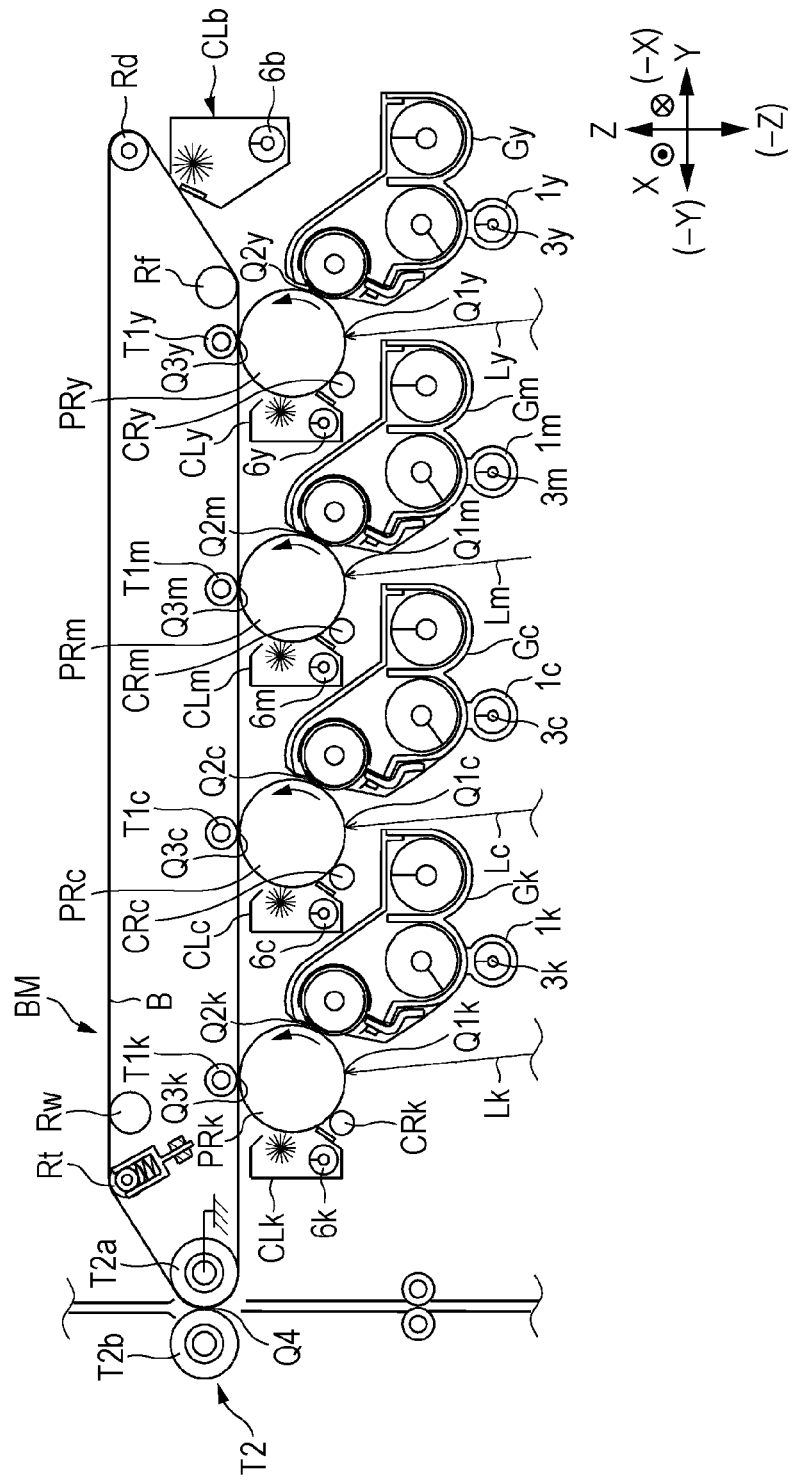
FIG. 2 is an explanatory view of a portion of an image recording unit according to the first exemplary embodiment.

FIG. 2 is an explanatory view of a portion of the image recording unit according to the first exemplary embodiment.

The image processing unit GS is electrically connected to a writing circuit DL of the printer unit U1. The writing circuit DL is electrically connected to an exposure device ROS. The exposure device ROS serves as an example of a latent image forming device.

The exposure device ROS according to the first exemplary embodiment is capable of outputting laser beams Ly, Lm, Lc, and Lk corresponding to colors Y, M, C, and K. The laser beams Ly, Lm, Lc, and Lk each serve as an example of writing light. The exposure device ROS is capable of outputting the laser beams Ly to Lk corresponding to signals input thereto from the writing circuit DL.

In FIG. 1, photoconductor bodies PRy, PRm, PRc, and PRk are disposed on the upper side of the exposure device ROS. The photoconductor bodies PRy, PRm, PRc, and PRk each serve as an example of an image holding body. In FIGS. 1 and 2, regions irradiated with the laser beams Ly to Lk in the photoconductor bodies PRy to PRk respectively define writing regions Q1y, Q1m, Q1c, and Q1k.

Charging rollers CRy, CRm, CRc, and CRk are disposed upstream of the respective writing regions Q1y to Q1k in rotating directions of the respective photoconductor bodies PRy, PRm, PRc, and PRk. The charging rollers CRy to CRk each serve as an example of a charger. The charging rollers CRy to CRk according to the first exemplary embodiment are supported such that the charging rollers CRy to CRk are in contact with the photoconductor bodies PRy to PRk and rotated by rotations of the photoconductor bodies PRy to PRk.

Developing devices Gy, Gm, Cc, and Gk are disposed downstream of the respective writing regions Q1y to Q1k in the rotating directions of the respective photoconductor bodies PRy to PRk. Developing regions Q2y, Q2m, Q2c, and Q2k are defined by regions where the photoconductor bodies PRy to PRk and the respective developing devices Gy to Gk face one another.

First transfer rollers T1y, T1m, T1c, and T1k are disposed downstream of the respective developing devices Gy to Gk in the rotating directions of the respective photoconductor bodies PRy to PRk. The first transfer rollers T1y to T1k each serve as an example of a first transfer device. First transfer regions Q3y, Q3m, Q3c, and Q3k are defined by regions where the photoconductor bodies PRy to PRk and the respective first transfer rollers T1y to T1k face one another.

Photoconductor-body cleaners CLy, CLm, CLc, and CLk are disposed downstream of the respective first transfer rollers T1y to T1k in the rotating directions of the respective photoconductor bodies PRy to PRk. The photoconductor-body cleaners CLy, CLm, CLc, and CLk each serve as an example of a cleaner for the image holding body.

An image producing unit Uy for the color Y that forms a toner image includes the color-Y photoconductor body PRy, the charging roller CRy, the exposure device ROS that outputs the color-Y laser beam Ly, the developing device Gy, the first transfer roller T1y, and the photoconductor-body cleaner CLy. The image producing unit Uy serves as an example of a color-Y visible image forming device according to the first exemplary embodiment. The toner image serves as an example of a visible image. Likewise, image producing units Um, Uc, and Uk for the colors M, C, and K include the respective photoconductor bodies PRm, PRc, and PRk, the respective charging rollers CRm, CRc, and CRk, the exposure device ROS, the respective developing devices Gm, Gc, and Gk, the respective first transfer rollers T1m, T1c, and T1k, and the respective photoconductor-body cleaners CLm, CLc, and CLk.

A belt module BM is disposed on the upper surface of the photoconductor bodies PRy to PRk. The belt module BM serves as an example of an intermediate transfer device. The belt module BM includes an intermediate transfer belt B serving as an example of an intermediate transfer body. The intermediate transfer belt B includes an endless band-shaped member.

The intermediate transfer belt B according to the first exemplary embodiment is rotatably supported by the following rollers: that is, a belt drive roller Rd serving as an example of a drive member, a tension roller Rt serving as an example of a tension member, a working roller Rw serving as an example of a member for correcting deviation, an idler roller Rf serving as an example of a driven member, a backup roller T2a serving as a facing member for a second transfer region, and first transfer rollers T1y, T1m, T1c, and T1k.

A second transfer roller T2b is disposed at a position facing the backup roller T2a with the intermediate transfer belt B interposed therebetween. The second transfer roller T2b serves as an example of a second transfer member. In the first exemplary embodiment, the backup roller T2a is grounded, so that a second transfer voltage is applied to the second transfer roller T2b from a power source circuit E. The polarity of the second transfer voltage is opposite to a polarity to which tone is charged. A second transfer device T2 according to the first exemplary embodiment includes the backup roller T2a and the second transfer roller T2b. Furthermore, a second transfer region Q4 is defined by a region where the second transfer roller T2b and the intermediate transfer belt B are in contact with each other.

A belt cleaner CLb is disposed downstream of the second transfer region Q4 in a rotating direction of the intermediate transfer belt B. The belt cleaner CLb serves as an example of a cleaner for the intermediate transfer body.

A transfer device T1+T2+B according to the first exemplary embodiment includes the first transfer rollers T1y to T1k, the intermediate transfer belt B, the second transfer device T2, and so forth. Furthermore, the image recording unit Uy to Uk+T1+T2+B according to the first exemplary embodiment includes the image producing units Uy to Uk and the transfer device T1+T2+B.

In FIG. 1, three pairs of left and right guide rails GR are provided on the lower side of the image recording units Uy to Uk. The guide rails GR each serve as an example of a guide member. Each pair of guide rails GR support a corresponding one of sheet feed trays TR1 to TR3 such that the sheet feed trays TR1 to TR3 are allowed to be pulled out and inserted in the front-rear direction. The sheet feed trays TR1 to TR3 each serve as an example of a medium containing unit. Recording sheets S are contained in the sheet feed trays TR1 to TR3. The Recording sheets S each serve as an example of a medium.

Pickup rollers Rp are disposed at the upper left of the respective sheet feed trays TR1 to TR3. The Pickup rollers Rp each serve as an example of a pickup member. Separation rollers Rs are disposed downstream of the pickup rollers Rp in a transport direction of the recording sheets S. The Separation rollers Rs each serve as an example of a separation member. A sheet feeding path SH1 that extends upward is formed downstream of the separation rollers Rs in the transport direction of the recording sheets S. The sheet feeding path SH1 serves as an example of a medium transport path. Plural transport rollers Ra are disposed along the sheet feeding path SH1. The transport rollers Ra each serve as an example of a transport member.

A registration roller Rr is disposed upstream of the second transfer region Q4 along the sheet feeding path SH1. The registration roller Rr serves as an example of an adjusting member that adjusts transport timing.

A fixing device F is disposed downstream of the second transfer region Q4 in the transport direction of the recording sheets S. The fixing device F includes a heating roller Fh and a pressure roller Fp. The heating roller Fh and the pressure roller Fp respectively serve as an example of a fixing member for heating and an example of a fixing member for applying pressure. A fixing region Q5 is defined by a region where the heating roller Fh and the pressure roller Fp are in contact with each other.

A sheet output path SH2 is disposed on the upper side of the fixing device F. The sheet output path SH2 serves as an example of a transport path. A sheet output tray TRh is formed on an upper surface of the printer unit U1. The sheet output tray TRh serves as an example of a medium output unit. The sheet output path SH2 extends toward the sheet output tray TRh. A sheet output roller Rh is disposed at a downstream end of the sheet output path SH2. The sheet output roller Rh serves as an example of a medium transport member.

Description of Image Forming Operations

With the copier U according to the first exemplary embodiment including the above-described structure, in the case where an operator manually places each of the document sheets Gi on the platen glass PG so as to copy the document sheets Gi, the reading unit U2a is moved from the initial position in the left-right direction. Thus, the document sheet Gi on the platen glass PG is exposed to light and scanned. In the case where the document sheets Gi are copied by automatically transporting the document sheets Gi with the automatic feeder U3, the reading unit U2a is moved from the initial position to a document reading position indicated by solid lines in FIG. 1 and stopped. The plural document sheets Gi contained in the document tray TG1 are sequentially transported to and pass through the document reading position on the platen glass PG and ejected to the document sheet ejection tray TG2. Thus, the document sheets Gi that sequentially pass through the reading position on the platen glass PG are each exposed to the light from the reading unit U2a and scanned by the reading unit U2a while the reading unit U2a is stopped. The reflected light reflected by each of the document sheets Gi is received by the reading unit U2a. The reading unit U2a converts the reflected light received from the document sheet Gi into electrical signals.

The electrical signals output from the reading unit U2a are input to the image processing unit GS. The image processing unit GS converts the electrical signals of the R, G, and B color images having been read by the reading unit U2a into image information of yellow Y, magenta M, cyan C, and black K for forming latent images. The image processing unit GS outputs the converted image information to the writing circuit DL of the printer unit U1. In the case where an image is of a single color, that is, a so-called monochrome image, the image processing unit GS outputs the image information of only black K to the writing circuit DL.

The writing circuit DL outputs control signals according to the input image information to the exposure device ROS. The exposure device ROS outputs the laser beams Ly to Lk according to the control signals.

The photoconductor bodies PRy to PRk are rotated when image formation is started. Charging voltages are applied from the power source circuit E to the charging rollers CRy to CRk. Thus, the surfaces of the photoconductor bodies PRy to PRk are charged by the charging rollers CRy to CRk. Electrostatic latent images are formed on the surfaces of the charged photoconductor bodies PRy to PRk by the respective laser beams Ly to Lk in the respective writing regions Q1y to Q1k. The electrostatic latent images on the photoconductor bodies PRy to PRk are developed into toner images by the respective developing devices Gy, Gm, Gc, and Gk in the respective developing regions Q2y to Q2k. The toner images each serve as the example of the visible image.

The developed toner images are transported to the first transfer regions Q3y, Q3m, Q3c, and Q3k that are in contact with the intermediate transfer belt B serving as the example of the intermediate transfer body. The first transfer voltage having the polarity opposite to the polarity to which the toner is charged is applied to each of the first transfer rollers T1y to T1k from the power source circuit E in a corresponding one of the first transfer regions Q3y, Q3m, Q3c, and Q3k. Thus, the toner images on the photoconductor bodies PRy to PRk are transferred onto the intermediate transfer belt B by the respective first transfer rollers T1y to T1k. In the case of the toner images of multiple colors, the toner image or the toner images on the downstream side are transferred so as to be superposed on the toner image or the toner images transferred onto the intermediate transfer belt B in the first transfer region or the first transfer regions on the upstream side.

Substances remaining on or attracted to the photoconductor bodies PRy to PRk after first transfer has been performed is removed by the respective photoconductor-body cleaners CLy to CLk. Thus, the surfaces of the photoconductor bodies PRy to PRk having been cleaned are charged again by the respective charging rollers CRy to CRk.

A monochrome toner image or the multiple-color toner images having been transferred onto the intermediate transfer belt B by the first transfer rollers T1y to T1k in the first transfer regions Q3y to Q3k are transported to the second transfer region Q4.

The sheets S on which images are recorded are each picked up by the pickup roller Rp for one of the sheet feed trays TR1 to TR3 that is used. When plural sheets S superposed on one another are picked up by the pickup roller Rp, the sheets S having been picked up are separated from one another by a corresponding one of the separation rollers Rs. Each of the sheets S having been separated by the separation roller Rs is transported through the sheet feeding path SH1 by the transport rollers Ra. The sheet S having been transported through the sheet feeding path SH1 is fed to the registration roller Rr.

The registration roller Rr transports the sheet S to the second transfer region Q4 at timing at which the toner images formed on the intermediate transfer belt B are transferred to the second transfer region Q4. The second transfer voltage having the polarity opposite to the polarity to which the toner is charged is applied to the second transfer roller T2b from the power source circuit E. Accordingly, the toner images on the intermediate transfer belt B are transferred from the intermediate transfer belt B onto the sheet S.

Substances such as substances attracted to the surface of the intermediate transfer belt B having undergone second transfer are removed by the belt cleaner CLb.

The recording sheet S onto which the toner images have been transferred through second transfer is subjected to heat fixing while the sheet S passes through the fixing region Q5.

The recording sheet S onto which the images have been fixed is transported through the sheet output path SH2. The sheet S having been transported through the sheet output path SH2 is output to the sheet output tray TRh by the sheet output roller Rh.

Description of Image Reading Device

Figure 3:
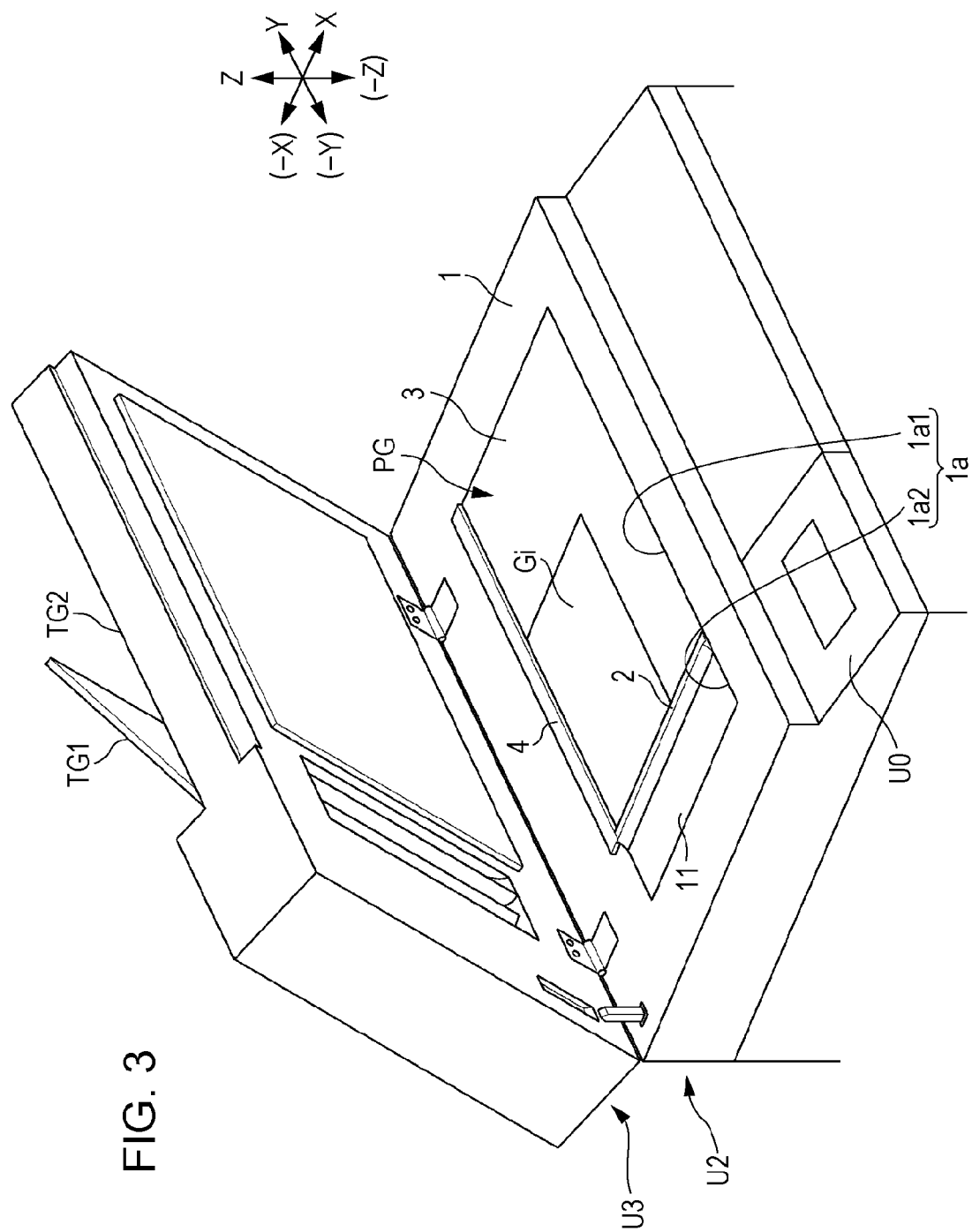
FIG. 3 is a perspective view of an image reading device and an openable member according to the first exemplary embodiment.

FIG. 3 is a perspective view of the image reading device and an openable member according to the first exemplary embodiment.

In FIG. 3, the scanner unit U2 serving as the example of the image reading device includes a case 1, which serves as an example of a housing. A glass support opening 1a is formed on an upper surface of the case 1. The glass support opening 1a serves as an example of an opening. The glass support opening 1a has a rectangular shape that is long in the left-right direction. A separating portion 2 extending in the front-rear direction is formed on a left portion of the glass support opening 1a. The separating portion 2 separates the glass support opening 1a into a manual reading opening 1a1 on the right and an automatic reading opening 1a2 on the left end. Thus, each of the reading openings 1a1 and 1a2 has a rectangular shape.

Figure 4:
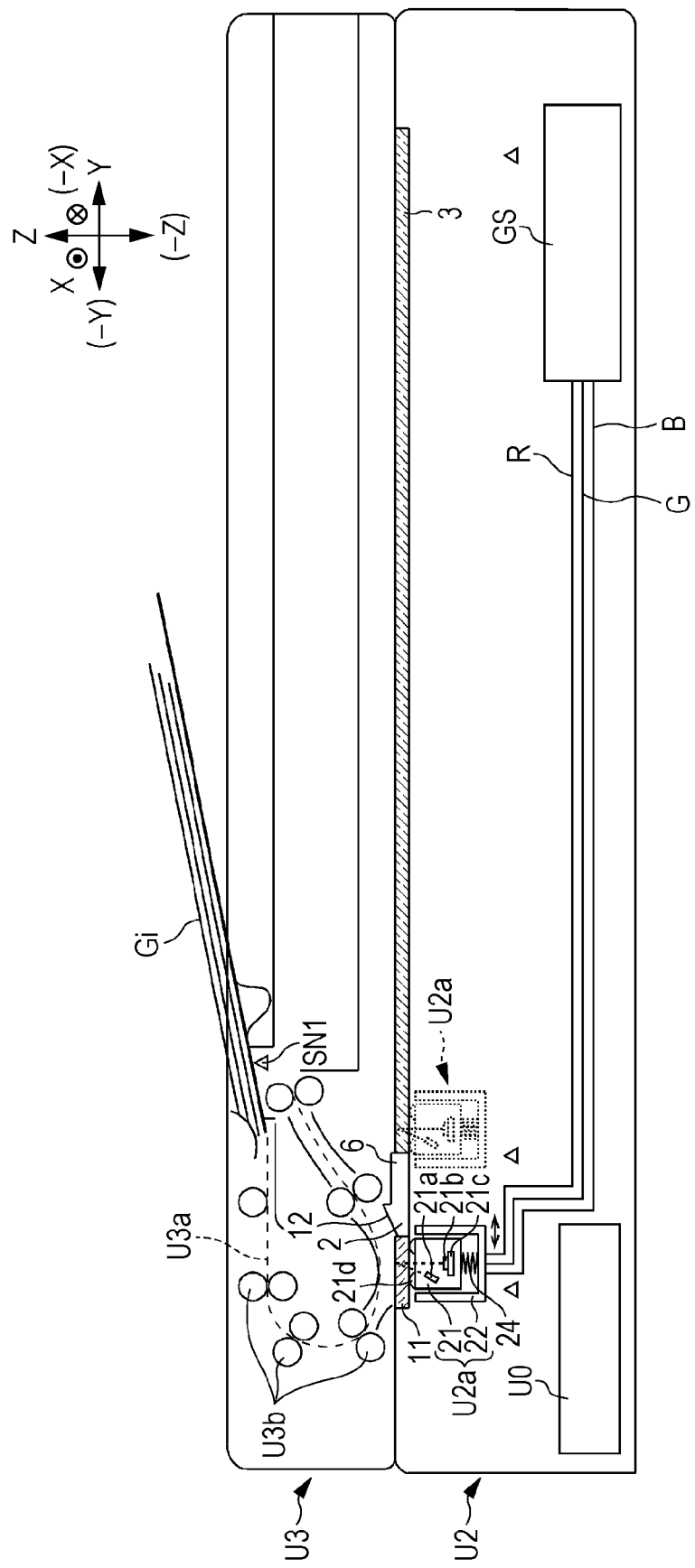
FIG. 4 is an explanatory view of the image reading device according to the first exemplary embodiment.

FIG. 4 is an explanatory view of the image reading device according to the first exemplary embodiment.

Referring to FIGS. 3 and 4, a document glass 3 is supported at the manual reading opening 1a1. The document glass 3 is an example of a first document table. The document glass 3 according to the first exemplary embodiment is formed of transparent flat glass. The document glass 3 supports a medium on which an image is recorded, that is, the document sheet Gi. The document glass 3 is formed in accordance with a preset maximum readable document size. In the first exemplary embodiment, a standardized A3 size is set as an example of the maximum readable document size. That is, the document glass 3 according to the first exemplary embodiment has a size that corresponds to the long side of the A3 size in the left-right direction and the short side of the A3 size in the front-rear direction.

A plate-shaped rear alignment portion 4 that extends in the left-right direction is supported on the rear side of the document glass 3. The rear alignment portion 4 is disposed along the rear end of the document glass 3. A level difference is provided between the rear alignment portion 4 and an upper surface of the document glass 3 on the upper side of the document glass 3. Thus, the rear alignment portion 4 allows an edge at the rear end of the document sheet Gi to be brought into contact therewith so as to align the position of the rear end of the document sheet Gi therewith. Furthermore, a plate-shaped left alignment portion 6 that extends in the front-rear direction is supported on the left side of the document glass 3, that is, on the right side of the separating portion 2. The left alignment portion 6 is disposed along the left end of the document glass 3. The left alignment portion 6 has a plate shape such that a level difference is provided between the left alignment portion 6 and the upper surface of the document glass 3 on the upper side of the document glass 3. Thus, the left alignment portion 6 allows an edge at the left end of the document sheet Gi to be brought into contact therewith so as to align the position of the left end of the document sheet Gi therewith.

Referring to FIGS. 3 and 4, a document glass 11 is supported in the automatic reading opening 1a2. The document glass 11 serves as an example of a second document table. The document glass 11 according to the first exemplary embodiment is formed of transparent flat glass. The document glass 11 has a length in the front-rear direction in accordance with a preset maximum readable document size. In the first exemplary embodiment, the length of the document glass 11 in the front-rear direction corresponds to the length of the short side of the A3 size. The document glass 3 and the document glass 11 are included in the platen glass PG, which serves as an example of a support surface according to the first exemplary embodiment.

A pad 16 is supported at the left end of an upper surface of the document glass 11. The pad 16 serves as an example of a guide member. The pad 16 is formed of a low-friction material so that the document sheets Gi transported toward the document glass 11 are guided rightward through the document transport path U3a. Each of the document sheets Gi guided by the pad 16 passes through the upper side of the document glass 11, is guided by a document guide 12, and transported by the document transport rollers U3b on the downstream side.

The document guide 12 that extends in the front-rear direction is supported on the right side of the document glass 11, that is, on the left side of the separating portion 2. The document guide 12 serves as an example of a document guide member. The document guide 12 has such a shape that the level in height thereof is set to be lower than that of the upper surface of the document glass 11 at the left end and becomes higher toward the right side.

Referring to FIGS. 1 and 4, the reading unit U2a is disposed on the lower side the platen glass PG.

The reading unit U2a includes a contact image sensor (CIS) unit 21 and a carriage 22. The CIS unit 21 serves as an example of a reading member. The carriage 22 serves as an example of a movement unit that supports the CIS unit 21.

The CIS unit 21 extends in a main scanning direction, which serves as an example of a second direction. In the first exemplary embodiment, the main scanning direction corresponds to the front-rear direction. A lamp 21a is supported in the CIS unit 21. The lamp 21a serves as an example of a light source. The lamp 21a radiates reading light, which is so-called illuminating light, toward the document sheet Gi on the upper surface of the document glass 3.

A light receiving unit 21b is supported in the CIS unit 21. The light receiving unit 21b receives the illuminating light reflected by the document sheet Gi so as to read an image. The light received by the light receiving unit 21b is processed into electrical signals by a board 21c. These electrical signals are transmitted to the image processing unit GS. Any of various known structures may be adopted for the CIS.

The CIS unit 21 according to the first exemplary embodiment is provided with four contact portions 21d that project upward at both the front and rear ends. The contact portions 21d each have an arc-shaped upper surface so that friction drag may be reduced even when the contact portions 21d are moved while being in contact with the lower surface of the document glass 3.

The CIS unit 21 is supported such that the CIS unit 21 is vertically movable relative to the carriage 22. The CIS unit 21 is urged upward by a spring 24, which serves as an example of a pressing member. Accordingly, the CIS unit 21 pressed by the spring 24 is held in a state in which the contact portions 21d are pressed against the lower surface of the document glass 3. That is, the distance between the lamp 21a of the CIS unit 21 and the document sheet Gi on the document glass 3 and the distances between the light receiving unit 21b of the CIS unit 21 and the document sheet Gi on the document glass 3 are maintained at respective preset spacings.

The carriage 22 according to the first exemplary embodiment is supported such that the carriage 22 is movable in the sub-scanning direction, which serves as the example of a first direction, by a guide shaft (not illustrated), which serves as an example of a unit guide member. Furthermore, a belt (not illustrated) is connected to the carriage 22 so that the carriage 22 is moved in the sub-scanning direction by rotating the belt in the forward and reverse directions. The belt serves as an example of a movement member. Thus, the reading unit U2a according to the first exemplary embodiment is moved in accordance with detection signals of plural sensors disposed on the lower side of the platen glass PG. In the case of reading the document sheet Gi transported by the automatic feeder U3, the reading unit U2a is moved to the position illustrated by the solid lines in FIG. 1. In the case of reading the document sheet Gi supported by the upper surface of the document glass, the reading unit U2a is moved rightward from a reading start position illustrated by broken lines in FIG. 1.

Figure 5:
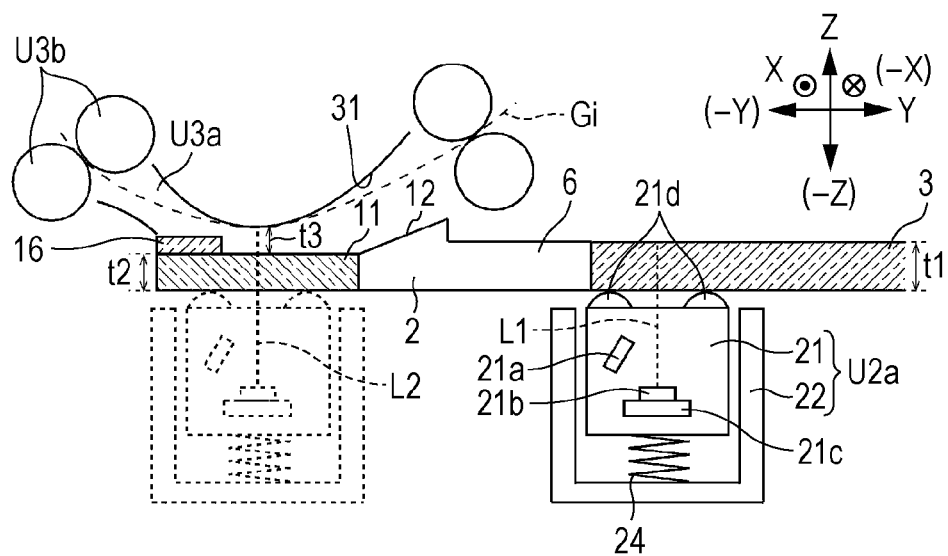
FIG. 5 is an enlarged view of portions of a manual document table and a second document table according to the first exemplary embodiment.

FIG. 5 is an enlarged view of portions of a manual document table and the second document table according to the first exemplary embodiment.

In FIG. 5, a document guide surface 31 is disposed on the upper side of the document glass 3 for reading. The document guide surface 31 allows the upper side of the document sheet Gi transported through the document transport path U3a, that is, the side of the document sheet Gi opposite to the reading side, to be guided thereon when the document sheet Gi is automatically read. Thus, when the document sheet Gi is automatically read, the document sheet Gi passes through the position of the guide surface 31.

In the first exemplary embodiment, an optical path length L1 for manual reading and an optical path length L2 for automatic reading are set to be the same. Specifically, when the thickness of the document glass 3 for manual reading is t1, the thickness of the document glass 11 for automatic reading is t2, the distance between the upper surface of the document glass 11 to the guide surface 31 is t3, the refractive index of air is 1, and the refractive index of glass is 1.52, the length t1 to t3 are set so as to satisfy the following equations (1):

$$L1=1.52 \times t1+t4$$

$$L2=1.52 \times t2+t3+t4$$

$$1.52 \times t1=1.52 \times t2+t3 \qquad \text{equations (1).}$$

In the first exemplary embodiment, the CIS unit 21 is pressed against the document glass 3 or 11. That is, a distance t4 between the light receiving unit 21b of the CIS unit 21 and the document glass 3 or 11 may be constantly maintained at a fixed value.

Here, in the first exemplary embodiment, as illustrated in FIGS. 4 and 5, the lower surfaces of the document glasses 3 and 11 are set to be flush with each other, and the reading unit U2a is movable in the left-right direction while being in contact with the lower surfaces of the document glass 3 or 11.

When the materials of the document glasses 3 and 11 are different from each other, equation (1) is generalized into the following equation (1'):

$$n1 \times t1=n2 \times t2+t3 \qquad \text{equation (1')}$$

where n1 and n2 are the refractive indices of the materials.

Functions of Image Reading Device According to First Exemplary Embodiment

In the scanner unit U2 according to the first exemplary embodiment having the above-described structure, in the case of reading the document sheet Gi transported by the automatic feeder U3, the reading unit U2a is moved to a position on the lower side of the document glass 11 for automatic reading so as to read the document sheet Gi passing along the guide surface 31 on the upper side of the reading unit U2a. In the case of reading the document sheet Gi supported on the upper surface of the document glass 3 for manual reading, the reading unit U2a is moved rightward from the reading start position so as to read the document sheet Gi.

At this time, according to the first exemplary embodiment, the thicknesses t1 and t2 of the document glasses 3 and 11 and the like are set so that the optical path length L1 between the reading unit U2a and the document sheet Gi on the upper surface of the document glass 3 and the optical path length L2 between the reading unit U2a and the document sheet Gi transported by the automatic feeder U3 correspond to each other.

If the thicknesses of the document glasses 3 and 11 are the same, the document sheet Gi is required to be in close contact with the document glass 11 while being transported in the case where the document sheet Gi is transported by the automatic feeder U3. With this structure, part of the image of the document sheet Gi may be lost or paper dust of the document sheet Gi may drop due to the document being rubbed at high-speed. Furthermore, in the case where, for example, a correction fluid, correction tape, a tackiness agent, or the like has been attracted to the front side of the document sheet Gi, the document glass 11 may be contaminated by the correction fluid, the correction tape, the tackiness agent, or the like which is attracted from the document sheet Gi to the document glass 11. This may cause the read image to be adversely affected. In order to address this, according to the present invention, the document sheet Gi is guided so that the front side of the document sheet Gi is reliably brought into contact with a step of the pad 16, the level in height of which is higher than that of the platen glass PG, provided upstream of a reading position in an ensured manner. In addition, the document sheet Gi is moved up by the guide 12 having a jump stand shape, the level in height of which is higher than that of the step of the pad 16, on the downstream side of the document reading position. Thus, in the case where the document sheet Gi is transported by the automatic feeder U3, the document sheet Gi may be stably transported in a state in which the document sheet Gi is kept separate from the document glass 11.

Here, in the case where the automatic feeder U3 is used while the thicknesses of the document glasses 3 and 11 are set to be the same, the optical path lengths L1 and L2 become different from each other when the document sheet Gi is kept separate from the document glass 11. If the optical path lengths are not the same, the exact sizes of a read image of the document sheet Gi on the document glass 3 and a read image of the document sheet Gi transported by the automatic feeder U3 are not necessarily the same or the image qualities become different from each other between the former and the latter due to the difference in focal position, offset caused by the effects of aberration, or the like. In particular, in the case where the CIS unit 21 is used, the produced effects tend to increase, so that, for example, so-called blur may occur due to the characteristics of the CIS when the optical path lengths are different from each other.

In contrast, since the optical path lengths L1 and the L2 are the same according to the first exemplary embodiment, images may be stabilized in both the cases where the automatic feeder U3 is used and where the automatic feeder U3 is not used.

Second Exemplary Embodiment

Figure 6:
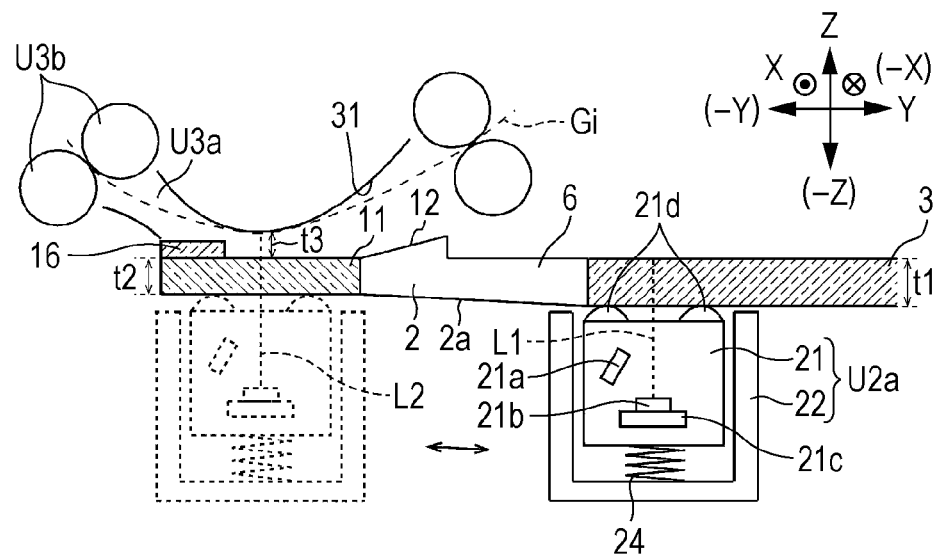
FIG. 6 is an explanatory view of an image reading device according to a second exemplary embodiment corresponding to FIG. 5 of the first exemplary embodiment.

FIG. 6 is an explanatory view of the image reading device according to a second exemplary embodiment corresponding to FIG. 5 of the first exemplary embodiment.

The second exemplary embodiment of the present invention will be described below. In the description of the second exemplary embodiment, elements corresponding to the elements of the first exemplary embodiment are denoted by the same reference signs and detailed description thereof is omitted.

This second exemplary embodiment is structured similarly to or in the same manner as the first exemplary embodiment except for the features described below.

Referring to FIG. 6, unlike the first exemplary embodiment in which the lower surfaces of the document glasses 3 and 11 are flush with each other, the upper surfaces of the document glasses 3 and 11 are flush with each other in the scanner unit U2 according to the second exemplary embodiment. The thicknesses t1 and t2 of the document glasses 3 and 11 and the like are set so as to satisfy the above-described equations (1) also in the second exemplary embodiment. Accordingly, the levels in height of the lower surfaces of the document glasses 3 and 11 are different from each other in the second exemplary embodiment.

A lower surface 2a of the separating portion 2, which serves as an example of a connecting portion, includes an inclined surface inclined upward from the right side to the left side so as to connect the lower surfaces of the document glasses 3 and 11 to each other. Thus, when the reading unit U2a is moved in the left-right direction, the reading unit U2a is guided along the lower surface 2a of the separating portion 2. At this time, the CIS unit 21 of the reading unit U2a is vertically movable and pressed upward by the spring 24 relative to the carriage 22. Thus, the CIS unit 21 is maintained in a state in which the CIS unit 21 is in contact with the document glass 3 or 11.

The scanner unit U2 according to the second exemplary embodiment having the above-described structure may stabilize the image quality in both reading of the document sheet Gi with the automatic feeder U3 and reading of the document sheet Gi supported by the upper surface of the document glass 3 as is the case with the first exemplary embodiment.

Also in the second exemplary embodiment, the upper surfaces of the document glasses 3 and 11 may be flush with each other. Thus, compared to the case where a portion corresponding to the document glass 11 for automatic reading is recessed, the levels in height of the glass surfaces may be easily determined since it is sufficient that the document glasses be positioned at the same levels in height relative to a frame in which the document glasses are disposed.

Third Exemplary Embodiment

Figure 7:
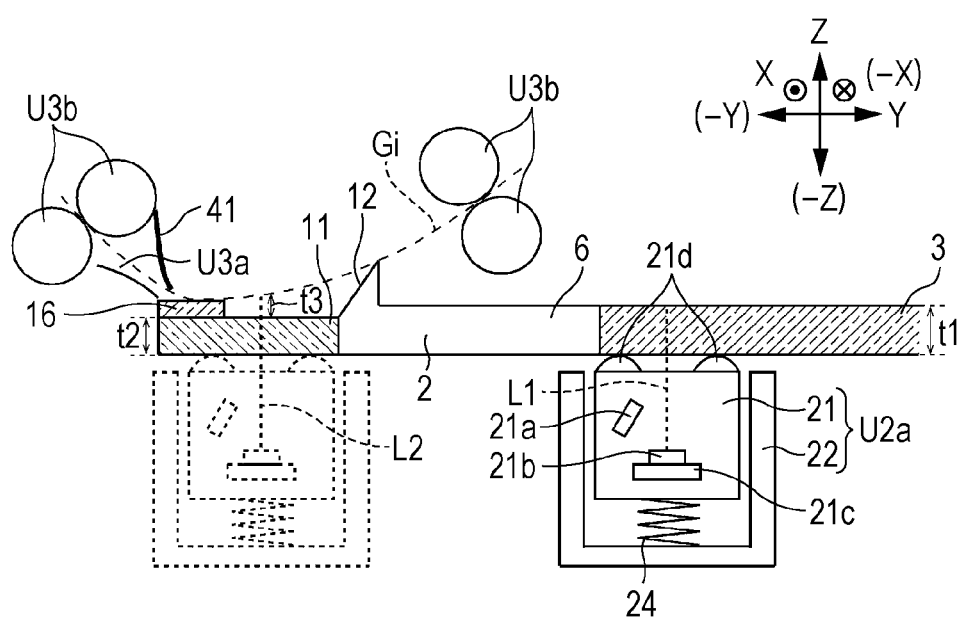
FIG. 7 is an explanatory view of an image reading device according to a third exemplary embodiment corresponding to FIG. 5 of the first exemplary embodiment.

FIG. 7 is an explanatory view of the image reading device according to a third exemplary embodiment corresponding to FIG. 5 of the first exemplary embodiment.

The third exemplary embodiment of the present invention will be described below. In the description of the third exemplary embodiment, elements corresponding to the elements of the first exemplary embodiment are denoted by the same reference signs and detailed description thereof is omitted.

This third exemplary embodiment is structured similarly to or in the same manner as the first exemplary embodiment except for the features described below.

Referring to FIG. 7, the scanner unit U2 of the third exemplary embodiment is different from that of the first exemplary embodiment that includes the guide surface 31. Specifically, a thin-film-shaped elastic film 41 that guides the document sheet Gi to the document glass side is disposed upstream of the document glass 11 in a transport direction of the document sheet. The elastic film 41 serves as an example of a guide member. The pad 16 is supported on the lower side of the elastic film 41 at the left end of the upper surface of the document glass 11. The pad 16 serves as an example of a second guide member. The pad 16 is formed of a low-friction material so as to guide rightward the document sheets Gi having been guided downward by the elastic film 41. The document sheet Gi guided by the pad 16 passes through the upper side of the document glass 11, is guided by the document guide 12, and transported by the document transport rollers U3b on the downstream side.

In the third exemplary embodiment, the distance t3 in equations (1) is, as illustrated in FIG. 7, the distance t3 between the upper surface of the document glass 11 and a position where the front side of the document sheet Gi passes through. The thicknesses t1 and t2 of the document glasses 3 and 11 are set so as to satisfy equations (1).

The scanner unit U2 according to the third exemplary embodiment having the above-described structure may stabilize the image quality in both reading of the document sheet Gi with the automatic feeder U3 and reading of the document sheet Gi supported by the upper surface of the document glass 3 as is the case with the first and second exemplary embodiments. Also, a document sheet Gi guide structure in the third exemplary embodiment, which is different from that in the first and second exemplary embodiments, may stabilize the image quality.

Modifications

Although the exemplary embodiments of the present invention have been described in detail, the present invention is not limited to the foregoing exemplary embodiments. Various modifications are possible within the scope of the gist of the present invention described in the claims. Modifications (H01 to H03) to the present invention are exemplified below.

(H01) Although the image forming apparatus is exemplified by the copier U in the foregoing exemplary embodiments, the image forming apparatus is not limited to this. The image forming apparatus is applicable to an apparatus such as a facsimile machine or a multi-function machine having plural functions such as the functions of the facsimile machine, the printer, the copier, and so forth. The image forming apparatus is not limited to the electrophotographic image forming apparatus. The image forming apparatus is applicable to an image forming apparatus of any image forming method such as an ink-jet recording printer, a thermal head printer, a lithographic printer, or the like. The image forming apparatus is not limited to the multi-color developing image forming apparatus. The image forming apparatus may instead be a single color image forming apparatus, that is, a so-called monochrome image forming apparatus. Also in the foregoing exemplary embodiments, the image reading device is exemplified by the scanner unit U2, which is included in the copier U in the example. However, the image reading device is not limited to this and the present invention is applicable to a standalone scanner.

(H02) In the foregoing exemplary embodiments, the upper or lower surfaces of the document glasses 3 and 11 are flush with each other. However, this does not limit the document glasses 3 and 11. The document glasses 3 and 11 may be arranged such that neither the upper nor lower surfaces thereof are flush with each other.

(H03) In the foregoing exemplary embodiments, the optical path lengths L1 and L2 are exactly the same. However, this does not limit the optical path lengths L1 and L2. The optical path lengths L1 and L2 are not necessarily completely the same as each other and may be the values almost corresponding to each other in accordance with, for example, the degree of required image quality, processing accuracy of the glasses, the differences in the thicknesses of materials available on the market, and so forth.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
    a first document table being transparent and supporting a document sheet on which an image is recorded;
    a second document table being transparent and disposed adjacent to the first document table, the second document table allowing the document sheet being transported to pass therethrough while the document sheet is kept separate from the second document table;
    a document transport member configured to transport the document sheet toward the second document table; and
    a reading unit supported on a side opposite to the document sheet with the first and second document tables interposed therebetween, the reading unit reading the document sheet, the reading unit including a movement unit movable in a preset first direction relative to the first and second document tables,
    wherein as a result of reading the document sheet on the first document table, the reading unit s configured to read the image on the document sheet while the movement unit is moving in the first direction,
    wherein as a result of reading the document sheet on the second document table, the reading unit reading the image on the document sheet transported by the document transport member while the movement unit is stopped at a position facing the second document table,
    wherein the first table has a first thickness and the second document table has a second thickness such that a length of a first optical path between the reading unit and the document sheet located on an upper surface of the first document table corresponds to a length of a second optical path between the reading unit and the document sheet as the document sheet is being transported by the document transport member,
    wherein the first thickness is different from the second thickness.

2. The image reading device according to claim 1,
    wherein the first document table has a document support surface, and the second document table has a document surface through which the document sheet passes, and
    wherein a surface of the first document table opposite to the document support surface and a surface of the second document table opposite to the document passing surface are flush with each other.

3. The image reading device according to claim 1, further comprising:
    a connecting portion having an inclined surface,
    wherein the first document table has a document support surface, and the second document table has a document surface through which the document sheet passes,
    wherein the document support surface of the first document table and the document passing surface of the second document table are flush with each other, and
    wherein a surface opposite to the document support surface and a surface opposite to the document passing surface are connected to each other by the inclined surface of the connecting portion.

4. An image forming apparatus comprising:
    the image reading device according to claim 1, the image reading device reading an image from a medium; and
    an image recording unit that records an image on a medium in accordance with the image read by the image reading device.

5. The image reading device according to claim 1, wherein the length of the first optical path is a same length as the length of the second optical path.

6. The image reading device according to claim 1, wherein a lower surface of the first document table is flush with a lower surface of the second document table.

* * * * *